(12) United States Patent
Yuan

(10) Patent No.: US 8,560,492 B2
(45) Date of Patent: Oct. 15, 2013

(54) ROBUST FILTERING AND PREDICTION USING SWITCHING MODELS FOR MACHINE CONDITION MONITORING

(75) Inventor: Chao Yuan, Plainsboro, NJ (US)

(73) Assignee: Siemens Corporation, Iselin, NJ (US)

( * ) Notice: Subject to any disclaimer, the term of this patent is extended or adjusted under 35 U.S.C. 154(b) by 254 days.

(21) Appl. No.: 13/123,633

(22) PCT Filed: Oct. 2, 2009

(86) PCT No.: PCT/US2009/059357
§ 371 (c)(1),
(2), (4) Date: Apr. 11, 2011

(87) PCT Pub. No.: WO2010/047937
PCT Pub. Date: Apr. 29, 2010

(65) Prior Publication Data
US 2011/0196820 A1    Aug. 11, 2011

Related U.S. Application Data

(60) Provisional application No. 61/106,701, filed on Oct. 20, 2008.

(51) Int. Cl.
*G06F 15/00* (2006.01)
(52) U.S. Cl.
USPC .......................................................... 706/62
(58) Field of Classification Search
None
See application file for complete search history.

(56) References Cited

U.S. PATENT DOCUMENTS

| 5,019,824 | A  | * | 5/1991 | Kumar .......................... 342/195 |
| 6,260,427 | B1 |   | 7/2001 | Jones et al. |
| 6,384,384 | B1 | * | 5/2002 | Connolly et al. ............. 219/481 |
| 8,131,543 | B1 | * | 3/2012 | Weiss et al. .................... 704/233 |
| 2002/0103626 | A1 |   | 8/2002 | Manders |
| 2005/0102080 | A1 | * | 5/2005 | Dell' Eva et al. ............... 701/45 |
| 2010/0160807 | A1 | * | 6/2010 | Schmidt et al. ............... 600/528 |

FOREIGN PATENT DOCUMENTS

| CN | 1983092 A | 6/2007 |
| EP | 1133687 A1 | 9/2001 |

* cited by examiner

*Primary Examiner* — Kakali Chaki
*Assistant Examiner* — Mario Riojas Ramirez

(57) ABSTRACT

In a machine condition monitoring technique, a sensor reading is filtered using a switching Kalman filter. Kalman filters are created to describe separate modes of the signal, including a steady mode and a non-steady mode. For each new observation of the signal, a new mode is estimated based on the previous mode and state, and a new state is then estimated based on the new mode and the previous mode and state. In the steady mode, evolution covariances of both the observed signal and the rate of change of that signal are low. In the non-steady mode, the evolution covariance of the observed signal is set to a higher value, permitting the observed signal to vary widely, while the evolution covariance of the rate of change of the signal is maintained at a low level.

24 Claims, 6 Drawing Sheets

US 8,560,492 B2

ROBUST FILTERING AND PREDICTION USING SWITCHING MODELS FOR MACHINE CONDITION MONITORING

CLAIM OF PRIORITY

This application claims priority to, and incorporates by reference herein in its entirety, pending U.S. Provisional Patent Application Ser. No. 61/106,701, filed Oct. 20, 2008, and entitled "Robust Filtering and Prediction Using Switching Models for Machine Condition Monitoring."

FIELD OF THE DISCLOSURE

The present invention relates generally to machine condition monitoring for the purpose of factory automation. More specifically, the invention relates to techniques for filtering observed values in order to estimate a true signal value without noise.

BACKGROUND

The task of machine condition monitoring is to detect faults as early as possible to avoid further damage to a machine. That is usually done by analyzing data from a set of sensors, installed on different parts of a machine, for measuring temperature, pressure, vibrations, etc. When a machine works normally, the sensor data is located within a normal operating region. When the sensor data deviates much from that region, a fault may have occurred and an alarm should be made.

Sensor signals are often contaminated by noise. Removing noise and recovering the underlying true signals are fundamental tasks for machine condition monitoring. The present disclosure focuses on removing noise from a single sensor signal, but the proposed methodology is applicable to multiple signals.

In an exemplary system, there are t observed values $y_1, y_2 \ldots, y_t$ from time stamp 1 to time stamp t for a sensor. Since $y_t$ is often corrupted by noise, it is of interest to estimate the true signal $z_t$ without noise. Example observed and true values for a sensor are shown in the graph 200 of FIG. 2, where the horizontal axis indicates time (with day as unit) and the vertical axis indicates sensor value. The curve 210 denotes the observed signals $y_t$ and the curve 220 denotes the noise-free signal $z_t$.

Once the true signal $z_t$ is uncovered, fault detection may be performed using methods as simple as threshold-based rules. For example, if the example sensor is a pressure sensor and the pressure should never be larger than 0.5, the rule can be "IF $z_t > 0.5$, THEN this is a failure." Using that rule, the sensor represented in FIG. 2 yields an alarm at about t=230.

That system may be improved, however, by detecting the upward trend earlier. For example, if the slope of $z_t$ at t=215 can be correctly estimated, then it is possible to predict at t=215 that $z_t$ will hit 0.5 at t=230. That technique produces an alarm 15 days earlier, which is a big benefit. The system therefore should estimate not only $z_t$, but also its derivatives such as velocity and acceleration (and so on). Those quantities are denoted as $\dot{z}_t$ and $\ddot{z}_t$, respectively. A vector is used to denote the above quantities of the true signal $x_t = [z_t, \dot{z}_t, \ddot{z}_t]^T$. To create predictive alarms as described above, the vector $x_t$ must be estimated.

A filtering problem is defined as: given a series of observations $y_1, y_2, \ldots, y^t$ (or $y_{1:t}$), $x_t$ is estimated. A widely used filtering algorithm is the Kalman filter model, which is formulated as follows:

$$x_t = Ax_{t-1} + v_t \qquad (1)$$
$$y_t = Cx_t + w_t$$

The first equation in (1) is a state evolution model. It specifies a linear relation between the current state $x_t$ and the previous state $x_{t-1}$. The evolution matrix A is defined as $$A = \begin{bmatrix} 1 & \Delta t & \Delta t^2/2 \\ 0 & 1 & \Delta t \\ 0 & 0 & 1 \end{bmatrix}, \qquad (2)$$

where $\Delta t$ is the time difference between adjacent data points; in this case $\Delta t = 1$ day. Note that $\Delta t$ can vary if signals are sampled with a varying interval. This linear relation follows simple physics about displacement, velocity and acceleration; for example $z_t = z_{t-1} + \Delta t \cdot \dot{z}_{t-1} + \Delta t^2/2 \cdot \ddot{z}_{t-1}$, $v_t$ is the evolution error vector and has a Gaussian distribution with zero mean and diagonal covariance $Q = \text{diag}([q_1, q_2, q_3])$. diag( ) is an operator transforming a vector into a diagonal matrix. $q_1$, $q_2$ and $q_3$ correspond to the variances for $z_t$, $\dot{z}_t$ and $\ddot{z}_t$, respectively.

The second equation in (1) is called the observation model. It relates the state $x_t$ with the observation $y_t$. The observation matrix $C = [1 \ 0 \ 0]$, because only $z_t$ is observable. The observation noise $w_t$ has a Gaussian distribution with zero mean and variance r. Both evolution covariance Q and observation noise variance r are parameters for this Kalman filtering model and can be either specified or learned from training data.

Kalman filtering proceeds in an iterative fashion. Once a new observation $y_t$ is available, the filter updates its estimate or conditional probability of $x_t$ given $y_{1:t}$. This can be proved to be single Gaussian distribution. Once the estimate for $x_t$ is obtained, a prediction is performed for a given future time T. Let $\Delta t = T - t$. We have $z_T = z_t + \Delta t \cdot \dot{z}_t + \Delta t^2/2 \cdot \ddot{z}_t$. By doing this, the true value of the sensor may be predicted at a future time stamp based on the information available only at the present time.

A filtering model such as the Kalman filtering model is widely used in many industrial applications with great success. In many real systems, however, the evolution of sensor signals is too complex to be described by a single filtering model. For example, in a non-steady mode of a machine, spikes or abrupt step changes are often observed in the sensor values. One example of a sensor output of such a system 500 is shown in FIG. 5. During spikes such as those at 521, 522, 523 and steps such as steps 511, 512, the true sensor signal changes dramatically in a short period, imposing a great challenge to the filtering algorithm.

There is therefore presently a need for an improved technique to filter sensor outputs in machine monitoring systems, for use in fault detection and predictive maintenance.

SUMMARY OF THE INVENTION

In the present disclosure, multiple filtering models are used to model sensor signals. A mode variable is introduced to indicate the operating mode of a machine. Different models are applied for different modes of a machine. For example, the traditional Kalman filtering model is used for the steady mode, but another Kalman filtering model is used for the non-steady mode. Switching models, in particular the switching Kalman filtering technique, are applied to perform filtering and prediction. The switching model can automatically determine the mode and apply the corresponding model for the mode.

One embodiment of the invention is a method for filtering a signal from a sensor in a machine monitoring system using a switching Kalman filter. The signal has at least a steady mode wherein a mode variable $s_t$ has a first value and a non-steady mode wherein $s_t$ has a second value.

At a machine monitoring computer, a new observation $y_t$ of the signal is received. An estimate of a current mode $s_t$ of the signal is computed based on the new observation $y_t$, a previous mode and a previous state $x_{t-1}$ of the signal, the previous state $x_{t-1}$ comprising values for at least a previous true signal $z_{t-1}$ and a first derivative $\dot{z}_{t-1}$ of the previous true signal.

An estimate of a current state $x_t$ of the signal is computed based on the estimate of the current mode $s_t$, the previous mode $s_{t-1}$ and the previous state $x_{t-1}$. The previous mode $s_{t-1}$ is then set equal to the estimate of the current mode $s_t$, and the previous state $x_{t-1}$ is set equal to the estimate of the current state $x_t$. The steps are then repeated.

The step of computing an estimate of a current state $x_t$ of the signal may include selecting a Kalman filter to compute the estimate of the current state $x_t$. The Kalman filter is then selected from at least a first Kalman filter for use when the current mode $s_t$ is the steady mode, and a second Kalman filter for use when the current mode $s_t$ is the non-steady mode.

The first and second Kalman filters may include evolution error vectors $v_t$ having diagonal covariances containing variances for at least a signal $z_t$ and a first derivative of that signal $\dot{z}_t$, wherein the variance for $z_t$ in the second Kalman filter is at least ten times the variance for $z_t$ in the first Kalman filter. In another embodiment, the variance for $z_t$ in the second Kalman filter is greater than the variance for $\dot{z}_t$ in the second Kalman filter and greater than the variances for $z_t$ and $\dot{z}_t$ in the first Kalman filter.

The first and second Kalman filters may differ only by an evolution covariance matrix. The variances for the signal $z_t$ and the first derivative of that signal, $\dot{z}_t$ may be learned from training data. At least one of the first and second Kalman filters may include an observation noise variance learned from training data.

The previous state $x_{t-1}$ of the signal may further comprise a value for a second derivative $\ddot{z}_{t-1}$ of the previous true signal.

The previous mode $s_{t-1}$ and the previous state of the signal may be maintained as a Gaussian mixture model.

The step of computing an estimate of a current ode $s_t$ may include implementing a probability of 0.9 that the current mode $s_t$ is equal to the previous mode $s_{t-1}$ and a probability of 0.1 that the current mode $s_t$ is not equal to the previous mode $s_{t-1}$. In an initial execution of the steps, the mode may be the steady mode wherein the mode variable $s_t=1$.

The method may further include the steps of predicting a future true signal $z_{t+1}$ based on the estimate of a current state $x_t$ of the signal; and producing an alarm if the predicted future signal is outside a set of process limits.

Another embodiment of the invention is a computer-usable medium having computer readable instructions stored thereon for execution by a processor to perform methods as described above.

DESCRIPTION

Figure 1:
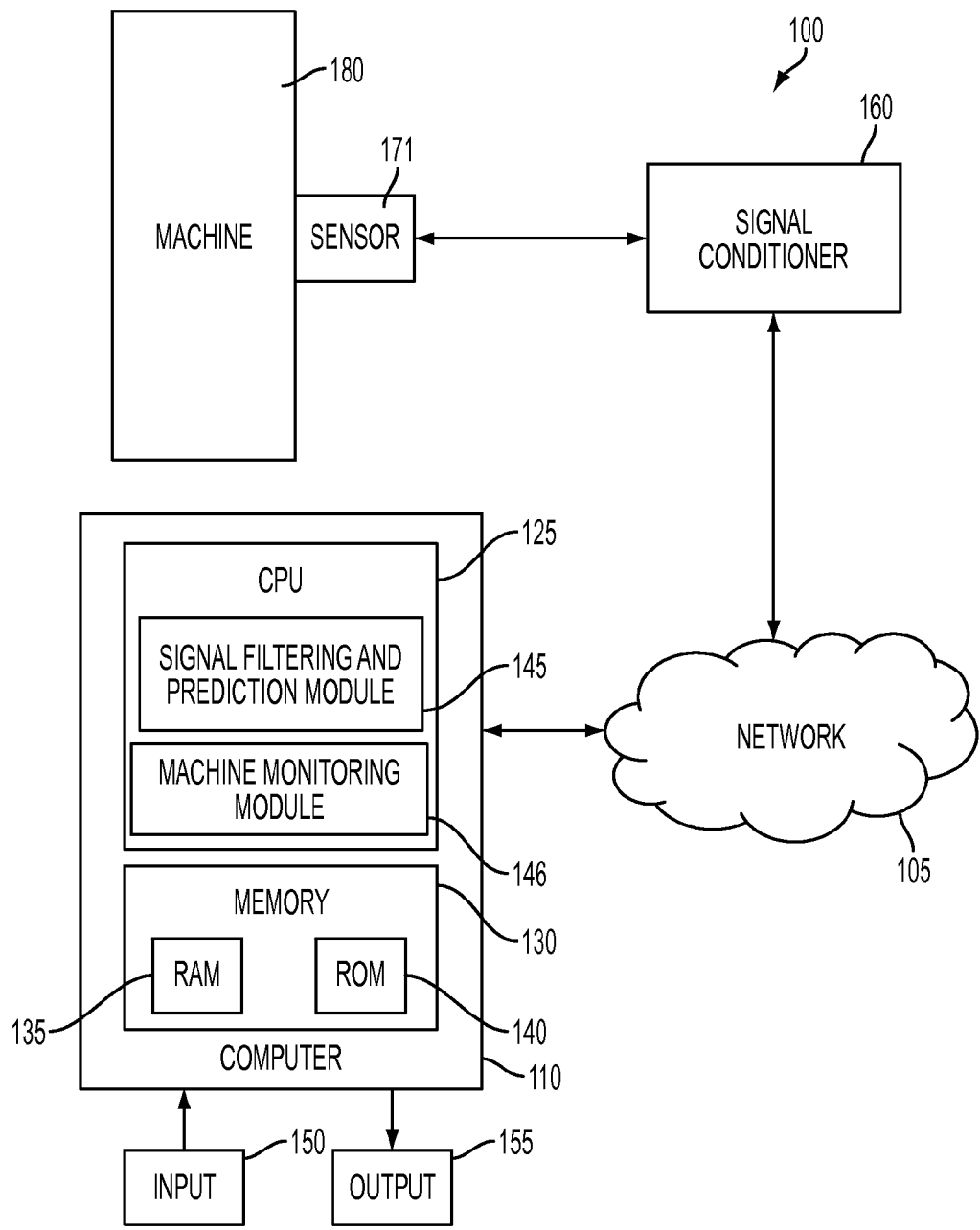
FIG. 1 is a schematic view showing a system according to the present disclosure.
Figure 2:
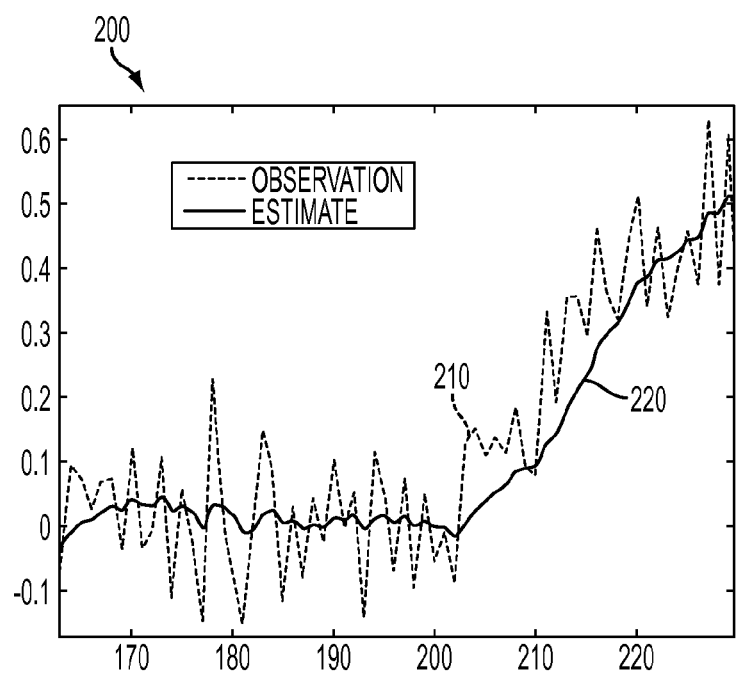
FIG. 2 is a graph showing observed and true values for an example sensor in a machine monitoring system.

The present invention may be embodied in a system for filtering sensor values, which may be included in a machine monitoring system or may be a stand-alone system. FIG. 1 illustrates a machine monitoring system 100 according to an exemplary embodiment of the present invention. As shown in FIG. 1, the system 100 includes a personal or other computer 110. The computer 110 may be connected to a sensor 171 over a wired or wireless network 105. The system preferably includes additional sensors (not shown) that are similarly connected.

The sensor 171 is arranged to acquire data representing a characteristic of the machine or system 180 or its environment. The sensor measures a characteristic such as temperature, pressure, humidity, rotational or linear speed, vibration, force, strain, power, voltage, current, resistance, flow rate, proximity, chemical concentration or any other characteristic. As noted above, the sensor 171 measures an observed value y that includes noise. The true signal z must be estimated.

The sensor 171 may be connected with the computer 110 directly through the network 105, or the signal from the sensor may be conditioned by a signal conditioner 160 before being transmitted to the computer. Signals from sensors monitoring many different machines and their environments may be connected through the network 105 to the computer 110.

The computer 110, which may be a portable or laptop computer or a mainframe or other computer configuration, includes a central processing unit (CPU) 125 and a memory 130 connected to an input device 150 and an output device 155. The CPU 125 includes a signal filtering and prediction module 145 that includes one or more methods for filtering signals and predicting signals as discussed herein. Although shown inside the CPU 125, the module 145 can be located outside the CPU 125, such as within the signal conditioner 160. The CPU may also contain a machine monitoring module 146 that acquires signals for use by the signal filtering and prediction module. The machine monitoring module 146 may also be used in acquiring training data from the sensor 171 for use in configuring the signal filtering and prediction module.

The memory 130 includes a random access memory (RAM) 135 and a read-only memory (ROM) 140. The memory 130 can also include a database, disk drive, tape drive, etc., or a combination thereof. The RAM 135 functions as a data memory that stores data used during execution of a program in the CPU 125 and is used as a work area. The ROM 140 functions as a program memory for storing a program executed in the CPU 125. The program may reside on the ROM 140 or on any other computer-usable medium as computer readable instructions stored thereon for execution by the CPU 125 or other processor to perform the methods of the invention. The ROM 140 may also contain data for use by the programs, such as training data that is acquired from the sensor 171 or created artificially.

The input 150 may be a keyboard, mouse, network interface, etc., and the output 155 may be a liquid crystal display (LCD), cathode ray tube (CRT) display, printer, etc.

The computer 110 can be configured to operate and display information by using, e.g., the input 150 and output 155 devices to execute certain tasks. Program inputs, such as training data, etc., may be input through the input 150, may be stored in memory 130, or may be received as live measurements from the sensor 171.

The presently disclosed method for filtering and predicting machine monitoring sensor signals uses different filtering models for different modes of a machine. For example, a machine may have two modes: a steady mode and a non-steady mode. In accordance with the present disclosure, a separate model is applied for each mode. During the steady mode, the sensor signals are stable. In that case, an evolution covariance with small values for each of $q_1$, $q_2$ and $q_3$ is used.

On the other hand, during the non-steady mode, the sensor signals are more erratic. In that case, a different evolution covariance is designed as follows. First, the variance $q_1$ of the true signal $z_t$ is set to a very large value such that $z_t$ is allowed to change dramatically. Second, the variances for the higher order derivatives $q_2$, $q_3$ are kept the same small values as those of the steady mode. The reason this is that those high order derivatives can only exist for a continuous signal with smooth variations. Those derivatives should not change much with any significant and sudden changes of signals.

Two filters have been introduced for two modes of a machine. Those filters differ only by the evolution covariance matrix. A new mode variable $s_t$ is introduced to indicate the mode. If $s_t=1$, the machine is in the steady mode; if $s_t=2$, the machine is in the nonsteady mode. The corresponding evolution covariance matrices are denoted by $Q_1$, and for mode 1 (steady) and by $Q_2$ for mode 2 (non-steady).

Figure 3:
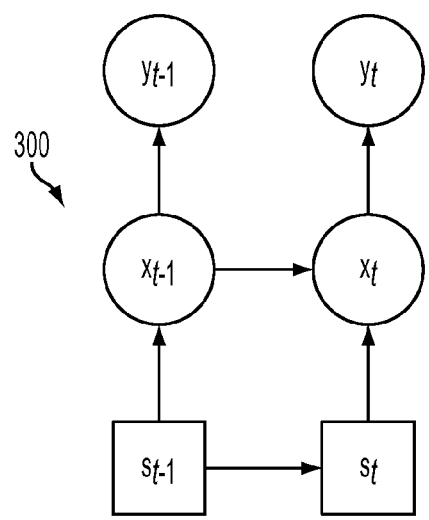
FIG. 3 is a graphical model of a switching Kalman filter according to the present disclosure.

Since at any time a machine can either stay in one mode or change to a different mode, a switching model is used in the present disclosure to perform filtering. In particular, the switching Kalman filtering methods are applied. A switching Kalman filtering method is described in K. P. Murphy, "Switching Kalman Filters," Compaq Cambridge Research Lab Tech. Report 98-10, 1998, which is hereby incorporated by reference in its entirety. The switching Kalman filtering method is widely used in signal processing. The network 300 of FIG. 3 shows a graphical model representation of the switching Kalman filter (SKF). Arrows indicate dependencies between variables. If $s_{t-1}$ and $s_t$ are the same, the model becomes a single Kalman filter. The prior probability of $s_t=s_{t-1}$ is set to be 0.9 and that of $s_t \neq s_{t-1}$ to be 0.1. That is based on the common-sense notion that a machine tends to stay in the same mode and has few mode changes. It is also assumed that at the beginning when t=1, the machine is in the steady mode.

Figure 4:
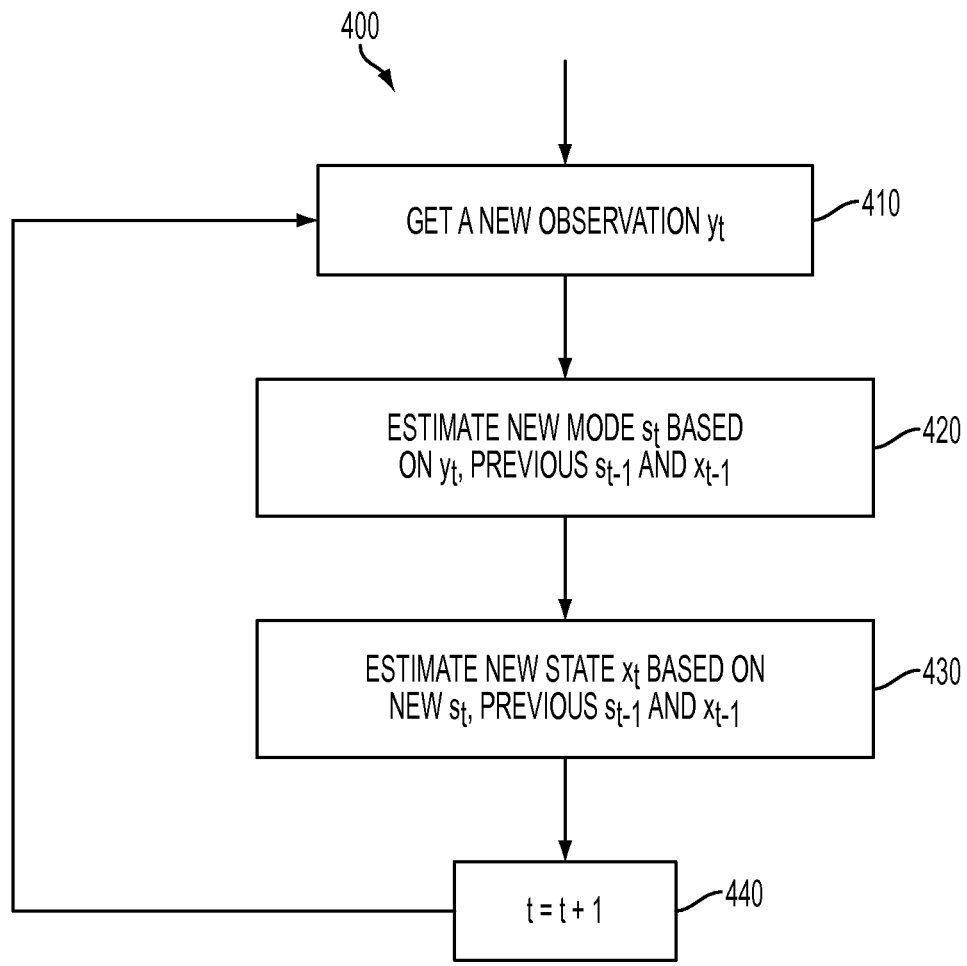
FIG. 4 is a work flow chart showing a method according to the present disclosure.

The flow chart of FIG. 4 illustrates a method 400 for performing filtering using the SKF model. At each time stamp t, the previous estimates of state $x_{t-1}$ and mode $s_{t-1}$ are kept as a Gaussian mixture model, since there are two modes and under each mode $x_{t-1}$ has a Gaussian distribution. A new observation $y_t$ is received at 410. For the new observation $y_t$, a new estimate for the mode $s_t$ is computed at 420, which is presented by a posterior probability of $P(s_t|y_t,y_{1:t-1})$. Then a new estimate is made at 430 for $x_t$, which is represented by a posterior probability of $P(x_t|s_t,y_t,y_{1:t-1})$. The new estimates of $x_t$ and $s_t$ will replace the previous $x_{t-1}$ and $s_{t-1}$. That procedure is repeated at 440 as time goes on.

Since state $x_t$ is represented by a Gaussian mixture, the mean of this mixture model is computed as the final point estimate of $x_t$. That point estimate will be used for prediction.

Test Results

Figure 5:
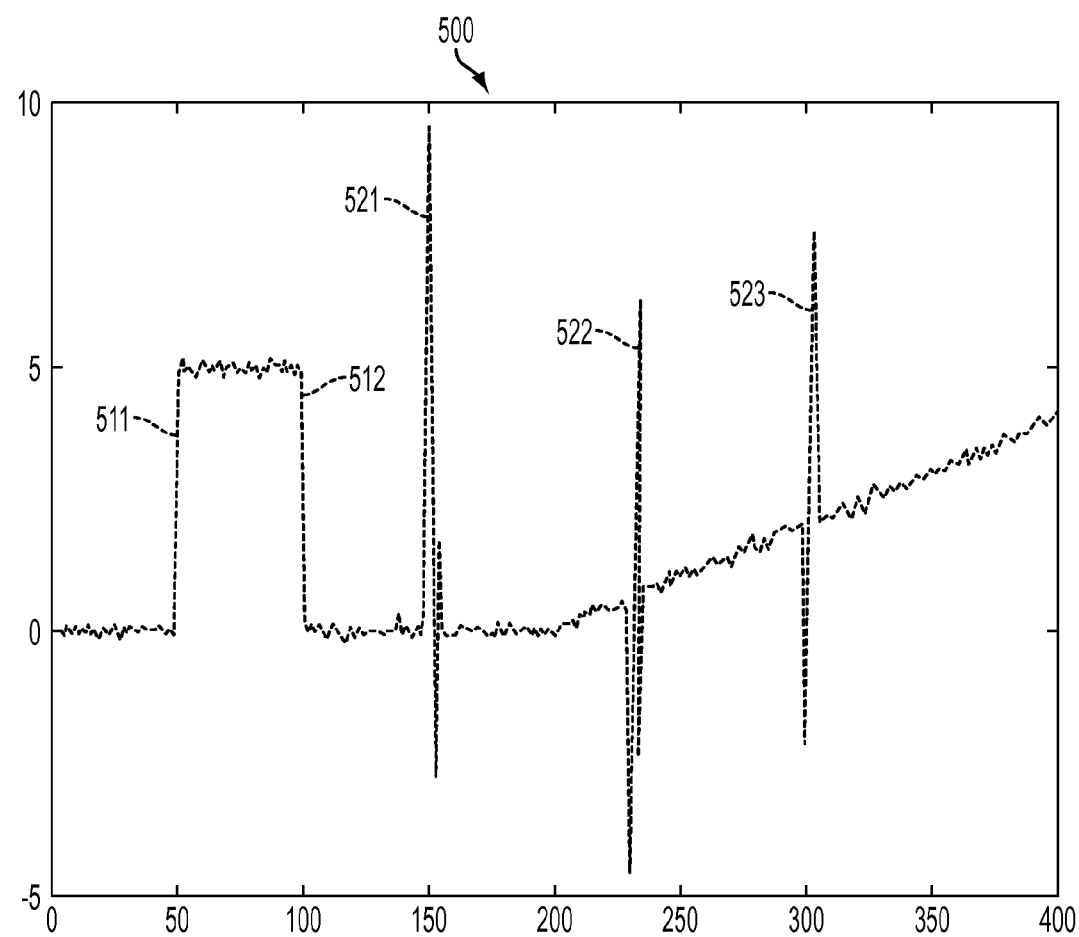
FIG. 5 is a graph showing a true signal from a sensor over time for use in an example implementation of the system according to the present disclosure.

The methods of the present disclosure are demonstrated using the following example. An observed signal 500 from a sensor is represented on the graph of FIG. 5 as a function of time. The signal is generally flat around zero between t=1 and t=200. The signal then trends upward with a slope=0.02 after t=200. Superimposed on that basic signal, the signal undergoes a step up 511 at t=50 and a step back down 512 to normal at t=100. In addition, the signal has large variations 521, 522, 523, at t=150, 230 and 300, respectively. In an actual machine monitoring system, those sudden changes are typically due to a non-steady working mode of a machine.

In this test, the performance of the proposed switching Kalman filtering is compared with that of single Kalman filtering. For the test, acceleration is ignored so that $x_t = [z_t, \dot{z}_t]^T$. The evolution matrix A and observation matrix C may be obtained accordingly by removing the corresponding row or third column representing acceleration.

For the single Kalman filtering, only steady state mode is considered with evolution covariance matrix Q=diag([0.00001 0.00001]). For the switching Kalman filtering model, the steady mode covariance $Q_1$ is set to Q. For the non-steady mode, however, a new $Q_2$=[100 0.00001] is used. Note that in the non-steady mode the variance $q_1$ for the true signal is much larger than the variance $q_2$ for the derivative. Specifically, in the example, the variance $q_1$ for the true signal is set to 100, while the variance $q_2$ for velocity is 0.00001, which is the same as the value for the steady mode. In the example, $q_1$ is $10^7$ times larger than $q_2$. In another example, $q_1$ is $10^4$ times larger; in yet another example, $q_1$ may be at least 10 times larger. In all cases, the variance $q_1$ in the non-steady mode is larger than the variance $q_2$ in the non-steady mode, and is larger than both variances $q_1$, $q_2$ in the steady mode. The observation noise r in the example is always set to 0.1.

Figure 6:
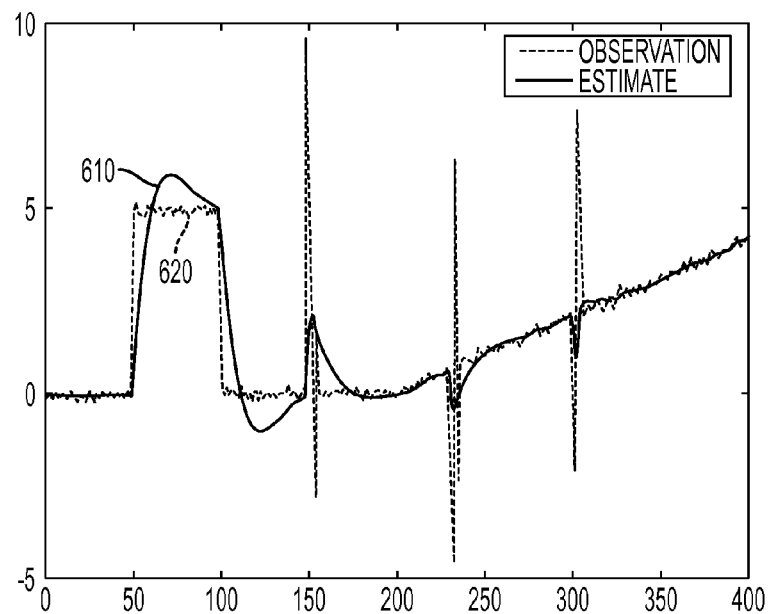
FIG. 6 is a graph showing an estimated true signal from a sensor using Kalman filtering.
Figure 7:
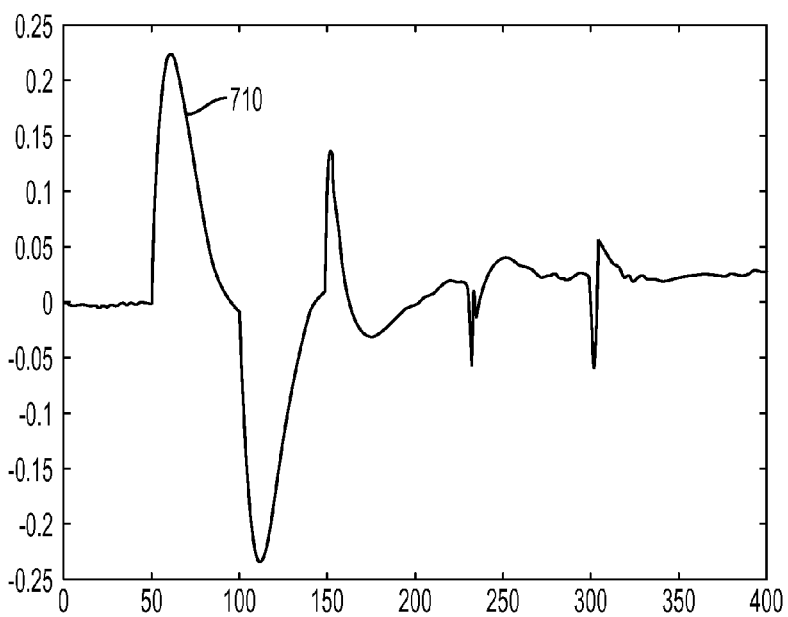
FIG. 7 is a graph showing an estimated velocity of a true signal from a sensor using Kalman filtering.

The estimated true signal $z_t$, as determined using the single Kalman filtering, is shown as line 610 in FIG. 6 superimposed over the observed signal 620. The estimated velocity $\dot{z}_t$ as determined using the Kalman filtering, is shown as line 710 in FIG. 7. The results at the beginning or at the end of the time frame are accurate. The estimates are adversely affected in the middle, however, by the nonsteady behavior of the signal. For example, at t=50, the Kalman filter tries to adapt to the sudden jump with changes to both the true signal and the velocity. That leads to poor results for both estimates. As a result, the velocity estimate is as high as 0.23 (FIG. 7). If one uses this falsely high velocity to predict future behaviors, false alarms are very likely to occur. Similar undesired results also happen at the periods with high signal variations.

Figure 8:
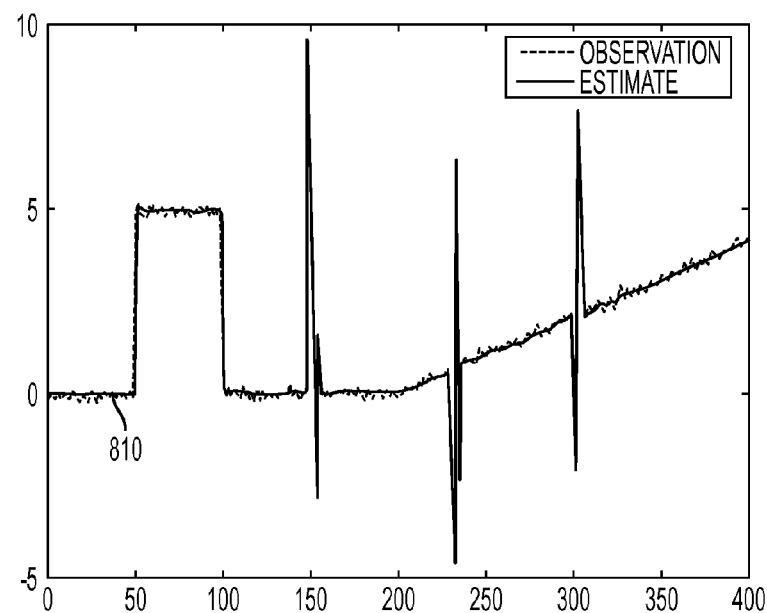
FIG. 8 is a graph showing an estimated true signal from a sensor using an SKF model according to the present disclosure.
Figure 9:
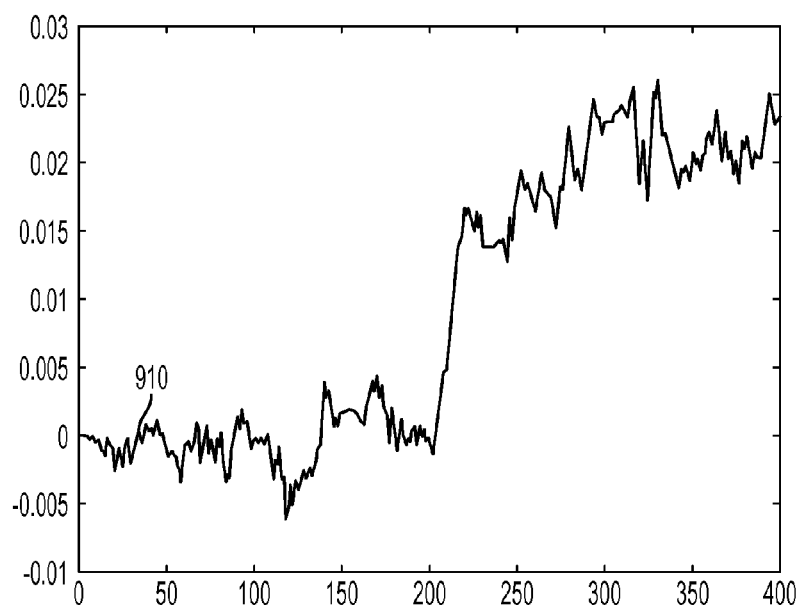
FIG. 9 is a graph showing an estimated velocity of a true signal from a sensor using an SKF model according to the present disclosure.

FIGS. 8 and 9 show the corresponding results using the switching Kalman filter (SKF) model of the present disclosure. The estimate 810 for the true signal (FIG. 8) fits the observed data much better than that using the Kalman filtering (FIG. 6). The velocity estimate 910 of FIG. 9 also reflects the ground truth nicely. For example, between t=1 and t=200, the estimated velocity is close to zero (the ground truth) with some fluctuation due to noise. After t=200, the velocity change is detected and the estimate quickly adapts to the change; after t=230, the estimated velocity fluctuates around 0.02 (the ground truth). The SKF model handles those non-steady periods very well and the estimates are not appreciably affected.

CONCLUSION

The foregoing Detailed Description is to be understood as being in every respect illustrative and exemplary, but not restrictive, and the scope of the invention disclosed herein is not to be determined from the Description of the Invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A method for filtering a signal from a sensor in a machine monitoring system using a switching Kalman filter, the signal having at least a steady mode wherein a mode variable $s_t$ has a first value and a non-steady mode wherein $s_t$ has a second value, the method comprising:
  receiving at a machine monitoring computer a new observation $y_t$ of the signal;
  computing an estimate of a current mode $s_t$ of the signal based on the new observation $y_t$, a previous mode $s_{t-1}$ and a previous state $x_{t-1}$ of the signal, the previous state $x_{t-1}$ comprising values for at least a previous true signal $z_{t-1}$ and a first derivative $\dot{z}_{t-1}$ of the previous true signal;
  computing an estimate of a current state $x_t$ of the signal based on the estimate of the current mode $s_t$, the previous mode $s_{t-1}$ and the previous state $x_{t-1}$ wherein computing an estimate of a current state $x_t$ of the signal comprises selecting a Kalman filter to compute the estimate of the current state $x_t$, the Kalman filter being selected from at least a first Kalman filter for use when the current mode $s_t$ is the steady mode, and a second Kalman filter for use when the current mode $s_t$ is the non-steady mode, wherein the first and second Kalman filters differ only by an evolution covariance matrix;
  setting the previous mode $s_{t-1}$ equal to the estimate of the current mode $s_t$, and setting the previous state $x_{t-1}$ equal to the estimate of the current state $x_t$; and
  repeating the above steps.

2. The method of claim 1, wherein the first and second Kalman filters include evolution error vectors $v_t$ having diagonal covariances containing variances for at least a signal $z_t$ and a first derivative of that signal $\dot{z}_t$ and wherein the variance for $z_t$ in the second Kalman filter is at least ten times the variance for $z_t$ in the first Kalman filter.

3. The method of claim 1, wherein the first and second Kalman filters include evolution error vectors $v_t$, having diagonal covariances containing variances for at least a signal $z_t$ and a first derivative of that signal $\dot{z}_t$, and wherein the variance for $z_t$ in the second Kalman filter is greater than the variance for $\dot{z}_t$ in the second Kalman filter and greater than the variances for $z_t$ and $\dot{z}_t$ in the first Kalman filter.

4. The method of claim 1, wherein the first and second Kalman filters include evolution error vectors $v_t$, having diagonal covariances containing variances for at least a signal $z_t$ and a first derivative of that signal $\dot{z}_t$.

5. The method of claim 4, wherein the variances for at least a signal $z_t$ and a first derivative of that signal, $\dot{z}_t$ are learned from training data.

6. The method of claim 1, wherein at least one of the first and second Kalman filters includes an observation noise variance learned from training data.

7. The method of claim 1, wherein the previous state $x_{t-1}$ of the signal further comprises a value for a second derivative $\ddot{z}_{t-1}$ of the previous true signal.

8. The method of claim 1, wherein the previous mode $s_{t-1}$ and the previous state $x_{t-1}$ of the signal are maintained as a Gaussian mixture model.

9. The method of claim 1, wherein the step of computing an estimate of a current mode $s_t$ includes implementing a probability of 0.9 that the current mode $s_t$ is equal to the previous mode $s_{t-1}$ and a probability of 0.1 that the current mode $s_t$ is not equal to the previous mode $s_{t-1}$.

10. The method of claim 1, wherein, in an initial execution of the steps, the mode is the steady mode wherein the mode variable $s_t=1$.

11. The method of claim 1, further comprising the steps of:
  predicting a future true signal $z_{t+1}$ based on the estimate of a current state $x_t$ of the signal; and
  producing an alarm if the predicted future signal is outside a set of process limits.

12. A non-transitory computer-readable medium having computer readable instructions stored thereon for execution by a processor to perform a method for filtering a signal from a sensor in a machine monitoring system using a switching Kalman filter, the signal having at least a steady mode wherein a mode variable $s_t$ has a first value and a non-steady mode wherein $s_t$ has a second value, the method comprising:
  receiving at a machine monitoring computer a new observation $y_t$ of the signal;
  computing an estimate of a current mode $s_t$ of the signal based on the new observation $y_t$, a previous mode $s_{t-1}$ and a previous state $x_{t-1}$ of the signal, the previous state $x_{t-1}$ comprising values for at least a previous true signal $z_{t-1}$ and a first derivative $\dot{z}_{t-1}$ of the previous true signal;
  computing an estimate of a current state $x_t$ of the signal based on the estimate of the current mode $s_t$, the previous mode $s_{t-1}$ and the previous state $x_{t-1}$, wherein computing an estimate of a current state $x_t$ of the signal comprises selecting a Kalman filter to compute the estimate of the current state $x_t$, the Kalman filter being selected from at least a first Kalman filter for use when the current mode $s_t$ is the steady mode, and a second Kalman filter for use when the current mode $s_t$ is the non-steady mode, wherein the first and second Kalman filters include evolution error vectors $v_t$, having diagonal covariances containing variances for at least a signal $z_t$ and a first derivative of that signal, $\dot{z}_t$, and wherein the variance for $z_t$ in the second Kalman filter is greater than the variance for $\dot{z}_t$ in the second Kalman filter and greater than the variances for $z_t$ and $\dot{z}_t$ in the first Kalman filter;
  setting the previous mode $s_{t-1}$ equal to the estimate of the current mode $s_t$, and setting the previous state $x_{t-1}$ equal to the estimate of the current state $x_t$; and
  repeating the above steps.

13. The non-transitory computer-readable medium of claim 12, wherein the first and second Kalman filters include evolution error vectors $v_t$ having diagonal covariances containing variances for at least a signal $z_t$ and a first derivative of that signal, $\dot{z}_t$, and wherein the variance for $z_t$ in the second Kalman filter is at least ten times the variance for $z_t$ in the first Kalman filter.

14. The non-transitory computer-readable medium of claim 12, wherein the first and second Kalman filters differ only by an evolution covariance matrix.

15. The non-transitory computer-readable medium of claim 12, wherein the first and second Kalman filters include evolution error vectors $v_t$ having diagonal covariances containing variances for at least a signal $z_t$ and a first derivative of that signal $\dot{z}_t$.

16. The non-transitory computer-readable medium of claim 15, wherein the variances for at least a signal $z_t$ and a first derivative of that signal, $\dot{z}_t$ are learned from training data.

17. The non-transitory computer-readable medium of claim 12, wherein at least one of the first and second Kalman filters includes an observation noise variance learned from training data.

18. The non-transitory computer-readable medium of claim 12, wherein the previous state $x_{t-1}$ of the signal further comprises a value for a second derivative $\ddot{z}_{t-1}$ of the previous true signal.

19. The non-transitory computer-readable medium of claim 12, wherein the previous mode $s_{t-1}$ and the previous state $x_{t-1}$ of the signal are maintained as a Gaussian mixture model.

20. The non-transitory computer-readable medium of claim 12, wherein the step of computing an estimate of a current mode $s_t$ includes implementing a probability of 0.9 that the current mode $s_t$ is equal to the previous mode $s_{t-1}$ and a probability of 0.1 that the current mode $s_t$ is not equal to the previous mode $s_{t-1}$.

21. The non-transitory computer-readable medium of claim 12, wherein, in an initial execution of the steps, the mode is the steady mode wherein the mode variable $s_t=1$.

22. The non-transitory computer-readable medium of claim 12, wherein the method further comprises the steps of:
predicting a future true signal $z_{t+1}$ based on the estimate of a current state $x_t$ of the signal; and
producing an alarm if the predicted future signal is outside a set of process limits.

23. A method for filtering a signal from a sensor in a machine monitoring system using a switching Kalman filter, the signal having at least a steady mode wherein a mode variable $s_t$ has a first value and a non-steady mode wherein $s_t$ has a second value, the method comprising:
receiving at a machine monitoring computer a new observation $y_t$ of the signal;
computing an estimate of a current mode $s_t$ of the signal based on the new observation $y_t$, a previous mode $s_{t-1}$ and a previous state $x_{t-1}$ of the signal, the previous state $x_{t-1}$ comprising values for at least a previous true signal $z_{t-1}$ and a first derivative $\dot{z}_{t-1}$ of the previous true signal;
computing an estimate of a current state $x_t$ of the signal based on the estimate of the current mode $s_t$, the previous mode $s_{t-1}$ and the previous state $x_{t-1}$, wherein computing an estimate of a current state $x_t$ of the signal comprises selecting a Kalman filter to compute the estimate of the current state $x_t$, the Kalman filter being selected from at least a first Kalman filter for use when the current mode $s_t$ is the steady mode, and a second Kalman filter for use when the current mode $s_t$ is the non-steady mode, wherein the first and second Kalman filters include evolution error vectors $v_t$ having diagonal covariances containing variances for at least a signal $z_t$ and a first derivative of that signal $\dot{z}_t$, and wherein the variance for $z_t$ in the second Kalman filter is at least ten times the variance for $z_t$ in the first Kalman filter;
setting the previous mode $s_{t-1}$ equal to the estimate of the current mode $s_t$, and setting the previous state $x_{t-1}$ equal to the estimate of the current state $x_t$; and
repeating the above steps.

24. A method for filtering a signal from a sensor in a machine monitoring system using a switching Kalman filter, the signal having at least a steady mode wherein a mode variable $s_t$ has a first value and a non-steady mode wherein $s_t$ has a second value, the method comprising:
receiving at a machine monitoring computer a new observation $y_t$ of the signal;
computing an estimate of a current mode $s_t$ of the signal based on the new observation $y_t$, a previous mode $s_{t-1}$ and a previous state $x_{t-1}$ of the signal, the previous state $x_{t-1}$ comprising values for at least a previous true signal $z_{t-1}$ and a first derivative $\dot{z}_{t-1}$ of the previous true signal;
computing an estimate of a current state $x_t$ of the signal based on the estimate of the current mode $s_t$, the previous mode $s_{t-1}$ and the previous state $x_{t-1}$ wherein computing an estimate of a current state $x_t$ of the signal comprises selecting a Kalman filter to compute the estimate of the current state $x_t$, the Kalman filter being selected from at least a first Kalman filter for use when the current mode $s_t$ is the steady mode, and a second Kalman filter for use when the current mode $s_t$ is the non-steady mode, wherein the first and second Kalman filters include evolution error vectors $v_t$, having diagonal covariances containing variances for at least a signal $z_t$ and a first derivative of that signal $\dot{z}_t$, and wherein the variance for $z_t$ in the second Kalman filter is greater than the variance for $\dot{z}_t$ in the second Kalman filter and greater than the variances for $z_t$ and $\dot{z}_t$ in the first Kalman filter;
setting the previous mode $s_{t-1}$ equal to the estimate of the current mode $s_t$, and setting the previous state $x_{t-1}$ equal to the estimate of the current state $x_t$; and
repeating the above steps.

* * * * *